United States Patent [19]
Moriguchi et al.

[11] 4,154,193
[45] May 15, 1979

[54] GLASS FRIT MIXTURE COATING APPARATUS

[75] Inventors: Hiroshi Moriguchi, Tatsuno; Yoshifumi Kunimura, Himeji, both of Japan

[73] Assignee: Tokyo Shibaura Electric Co., Ltd., Kawasaki, Japan

[21] Appl. No.: 851,386

[22] Filed: Nov. 14, 1977

[30] Foreign Application Priority Data

Nov. 16, 1976 [JP] Japan .................. 51-138021
Nov. 16, 1976 [JP] Japan .................. 51-154027[U]

[51] Int. Cl.² .................. B05C 1/02; B05C 13/02
[52] U.S. Cl. .................. 118/230; 118/238; 118/242; 118/244
[58] Field of Search .................. 118/6, 211, 230, 238, 118/239, 240, 242, 244, 258, 259, 261; 427/284

[56] References Cited
U.S. PATENT DOCUMENTS

| | | | |
|---|---|---|---|
| 2,399,688 | 5/1946 | Metzner et al. | 118/259 X |
| 2,510,463 | 6/1950 | Danziger | 118/230 |
| 3,056,696 | 10/1962 | Browne | 427/284 X |
| 3,407,782 | 10/1968 | Medley | 118/259 X |
| 3,516,387 | 6/1970 | Windsor | 118/242 X |
| 3,866,568 | 2/1975 | Minami | 118/238 |

*Primary Examiner*—John McIntosh
*Attorney, Agent, or Firm*—Cushman, Darby & Cushman

[57] ABSTRACT

A glass frit mixture coating apparatus comprising a container for containing a glass frit mixture, a roller for picking up the mixture and transferring and applying the mixture to a downward surface, and a reverser means for reversing and turning up the surface coated with the mixture.

1 Claim, 13 Drawing Figures

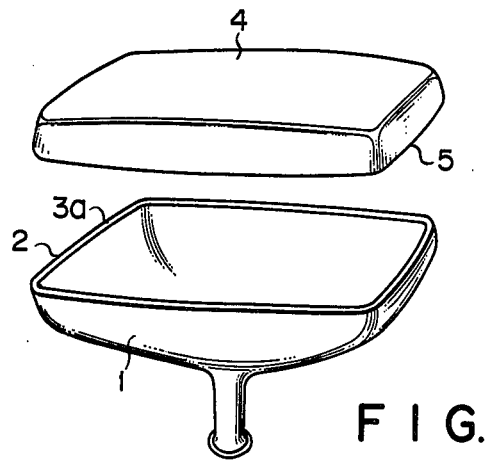
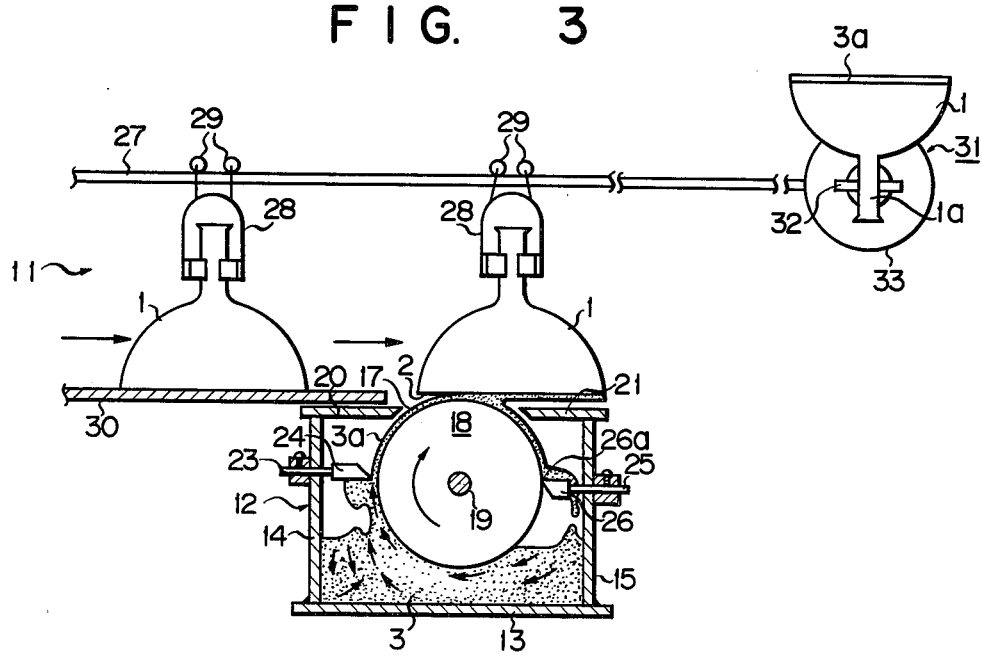

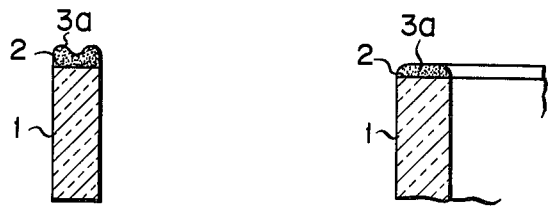
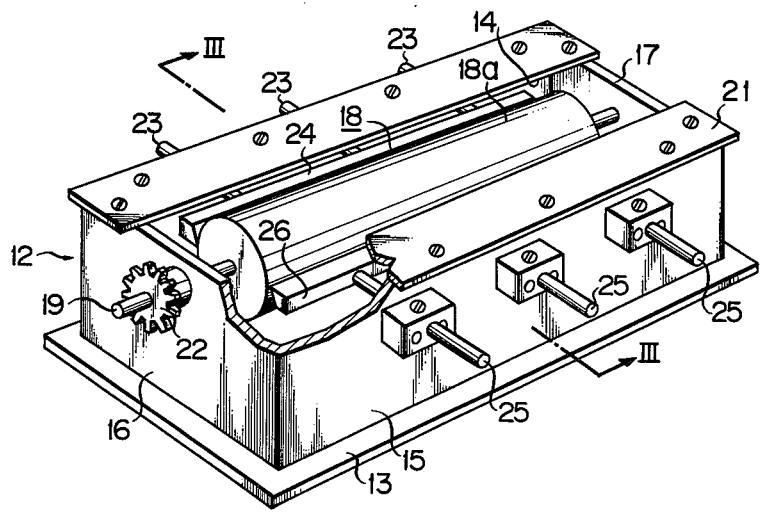

GLASS FRIT MIXTURE COATING APPARATUS

This invention relates to an apparatus for applying a glass frit mixture as a bonding agent to one surface in joining two surfaces together.

In maufacturing a cathode ray tube (CRT), for example, its funnel portion and panel portion are hermetically sealed by using a slimy glass frit mixture containing glass frit powder, organic thickener, solvent, etc. That is, a sealed end face 2 of a funnel 1, as shown in FIG. 1B, is coated with a glass mixture layer 3, which is heated and dried at e.g. 130° C. for 5 to 15 minutes. Subsequently, the sealed end face 2 of the funnel 1 and a sealed end face 5 of a panel 4 as shown in FIG. 1A are opposed to each other with the mixture layer 3a interposed therebetween, which is first heated at e.g. 400° C. for one hour to decompose and volatilize an organic thickener in the mixture layer, such as nitrocellulose. Then, the glass frit remaining in a mixture layer 3a is completely or incompletely crystallized, as the case may be, at a temperature of 400° to 450° C. and cooled, and the funnel 1 and panel 4 are hermetically joined together to provide a CRT's envelope.

In applying the glass frit mixture layer 3a relatively thick, e.g., 0.5 to 1.5 mm thick, the mixture has conventionally been dropped from above on to the funnel 1 with its sealed surface upward, considering the specific gravity of the mixture as large as 4 to 6. By such dropping method, however, a hollow is liable to be formed in the central portion of the mixture layer 3a as shown in FIG. 2 after drying.

If there exist such a hollow as mentioned above, voids will be formed between the layer 3a and the sealed end face of the panel 4 in joining the funnel 1 with the panel 4. If the layer 3a is fused in this state, then a large portion of the air in the voids will escape to the open air, but some air will fail to escape, thereby forming cavities in the bond layer after cooling. If cooling is performed while the air is escaping, then there will be formed holes to connect the inside with the outside of the CRT or portions that involve the existence of bond layer at the inner or outer end of the CRT only. These portions may lead to breakage of the vacuum seal of the CRT. Further, the effective width of the glass bond layer is substantially reduced at these portions, so that the voltage resisting property will be deteriorated and the vacuum seal of the CRT, occasionally the CRT itself, will after all be broken by the heat accompanying the discharge which may be caused by the voltage applied to the inside and outside of the CRT.

An object of this invention is to provide a glass frit mixture coating apparatus capable of forming relatively level layers of glass frit mixture, thereby eliminating the aforesaid defects.

Another object of the invention is to provide a glass frit mixture coating apparatus capable of consuming each supply of glass frit mixture without any substantial waste.

Other objects of the invention will be apparent in the following detailed description.

According to this invention, there is provided an apparatus for coating a downward surface with a glass frit mixture, comprising: a container means for containing the glass frit mixture; a roller means with a portion so located as to come into contact with the mixture for picking up the mixture to form on the peripheral face of the roller means a layer of the mixture and transferring the layer of mixture to the downward surface when the surface comes into contact with the layer, thereby coating the surface with the mixture; and a reverser means for reversing and turning up the surface coated with the mixture.

This invention can be more fully understood from the following detailed description when taken in conjunction with the accompanying drawings, in which:

FIGS. 1A and 1B are perspective views of the panel and funnel, bonded and sealed by means of the glass frit mixture capable of being applied by using the apparatus of this invention, to form a CRT;

FIG. 2 is a sectional view of the glass frit mixture layer applied by the conventional method of application showing the state after drying;

FIG. 3 is a sectional view of the coating apparatus of the invention as taken along line III—III of FIG. 4, showing an embodiment;

FIG. 4 is a perspective view of the coating apparatus of FIG. 3;

FIG. 5 is a sectional view of the glass frit mixture layer applied by means of the coating apparatus of the invention showing the state after drying;

Figure 6:
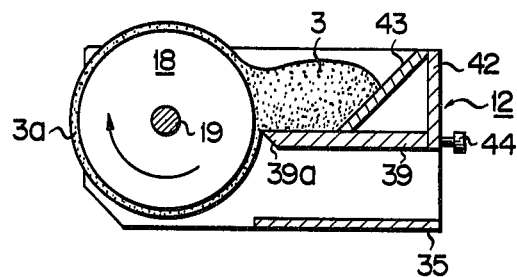
FIG. 6 is a sectional view of the coating apparatus of the invention as taken along line VI—VI of FIG. 7, showing another embodiment.

This invention is based on a view that a coating layer of a glass frit mixture, which will remain relatively level after drying, may be obtained by coating a downward subject surface, such as end face of a CRT's funnel, with the mixture from below and then reversing and turning up the coated surface within a fixed time.

This invention will now be described in connection with the accompanying drawings of FIGS. 3 to 12. Throughout the drawings similar parts or portions are denoted by the same reference numerals.

Referring first to FIGS. 3 and 4, there will be described an embodiment of this invention. A coating apparatus 11 as illustrated has a transversely elongated container 12 composed of a bottom plate 13, side plates 14 and 15, and end plates 16 and 17. In this container 12 is contained a glass frit mixture 3 with a viscosity of 7,000 cps containing 0.066 weight percent of nitrocellulose 7.33 weight percent of butyl acetate and 92.6 percent of glass frit powder, for example.

In the container 12 is disposed a roller 18 made of stainless steel, rubber or the like, whose shaft 19 is rotatably supported through both end plates 16 and 17. The lower portion of the roller 18 is immersed in (and brought in contact with) the mixture 3 in the container 12, while the upper portion barely protrudes upward to the outside from a space between a pair of top cover plates 20 and 21 disposed on the top of the container 12. The roller 18 is rotated by a driving mechanism (not shown) through a driving gear 22 mounted on a portion of the shaft 19 protruding outward from the end plate 16. The roller 18 picks up the mixture 3 in the container 12 during rotation to form a mixture layer 3a over its peripheral surface 18a. Preferably, the thickness of this mixture layer 3a is regulated by a thickness regulating rod 24 with a rectangular trapezoidal cross-section which is movably supported facing to the peripheral surface of the roller 18 at a distance therefrom by a plurality of rods 23 penetrating through the front side plate 14 of the container 12. The face of the rod 24 that is located facing to the roller 18 forms an edge. Meanwhile, a residue scraping rod 26 with an inverted-rectangular-trapezoidal section movably supported by a plurality of support rods 25 penetrating through the rear side plate 15 is preferably arranged so as to bring its edge into slight contact with the roller 18.

Above the container 12 is disposed a rail 27 to which chuck mechanisms 28 for suspending and shifting the end face 2 of the funnel 1 held downward are disposed at regular intervals. Under the rail 27 is disposed a level funnel support 30 which extends over the top cover plate 20 of the container 12. The funnel 1 sustained by each chuck mechanism 28 is stably conveyed along the surface of the support 30 to be brought into contact with the mixture layer 3a over the roller 18.

A reverser means 31 for reversing and turning up the end face 2 of the funnel coated with the mixture is vertically movably disposed on the rear end side of the rail 27. This reverser means 31 includes a clamp 32 to hold a neck portion 1a of the funnel 1 and a driving unit 33 such as a stepping motor for supporting and rotating the clamp 32.

In operation, when the roller 18 is rotated in the direction of the arrow as illustrated, the roller 18 picks up the mixture 3 to form over its peripheral surface the mixture layer 3a with a thickness uniformalized by the thickness regulating rod 24. Meanwhile, when the funnel 1 carried in the direction of the arrows by the chuck mechanism 28 comes into contact with the layer 3a over the roller 18, the layer 3a is transferred to the downward end face 2 of the funnel 1. In doing this, the height of the end face 2 of the funnel 1 should preferably be so set that the end face 2 cuts into the layer 3a over the roller to a depth of approximately 0.05 to 0.5 mm. Then, that portion of the mixture layer 3a over the roller 18 which contacts with the end face 2 of the funnel 1 may be transferred to the end face 2 of the funnel 1. The thickness of the mixture transferred to the end face 2 of the funnel 1 may be made uniform by setting the feeding speed of the funnel 1 at the same level as the peripheral speed of the mixture layer over the roller 18 at a position corresponding to the end face 2 of the funnel 1. Any mixture remaining on the roller 18 is removed therefrom by means of the scraping rod 26 and incorporated into the mixture 3 in the container 12.

The funnel 1 coated with the mixture moves along the rail to reach the reverser means 31, when the driving unit 33 comes down, the clamp 32 holds the neck 1a of the funnel 1, the chuck 28 is removed, and the driving unit 33 reverses the funnel 1 to turn up the end face 2 of the funnel 1. By doing this, the mixture layer 3a formed over the end face 2 of the funnel 1 is smoothed into a level layer with little curvedness as shown in FIG. 5 after drying.

While the duration from the application of the mixture to the funnel until the reversal of the funnel may vary with the viscosity or other physical properties of the mixture, coating thickness, size of the end face of the funnel and the like, the reversal should generally be done when the mixture applied to the funnel has ceased to drip. That is, a portion of the mixture applied to the funnel, immediately after the application, will drip in varied manners according to its viscosity; raindrop-like manner with lower viscosity and thready manner with higher viscosity, thereby attaining a uniform coating thickness. If the funnel is reversed in the middle of such dripping, the mixture will fall on to the inside and outside of the funnel. When using a mixture of the aforesaid composition and viscosity, for example, the reversal may duly be started 5 seconds after application. Meanwhile, when using a mixture with a quick-drying solvent such as ethyl acetate, the surface of the coating layer will be dried with the central portion projecting to cause a chevron-shaped layer after drying if the time before the reversal is longer. Therefore, the reversal would rather be started somewhat sooner. The time to start the reversal after application may easily be determined by one skilled in the art by means of a simple experiment.

The reversal speed of the funnel would rather be higher provided the coated mixture should not be scattered or biased by a centrifugal force. This reversal speed may suitably be determined according to the physical properties of the mixture, coating thickness, coating width, etc. If the viscosity of the mixture is 7,000 cps, the coating thickness is 0.8 mm, the coating width is 8 mm, and the turning radius of the mixture reversed is 40 cm or less, then the reversal may suitably be finished in approximately 0.5 to 1.5 seconds. In order to avoid applying a large centrifugal force to the coated mixture, the reversal speed should be made lower in the beginning and in the end, while it is made higher in the middle of the reversal. Further, the clamping point of the funnel should be deviated from the center of reversal toward the end face side.

Thereafter, an envelope for CRT is obtained by drying the mixture on the funnel and hermetically sealing the funnel with the panel in the same manner as the conventional case.

Figure 7:
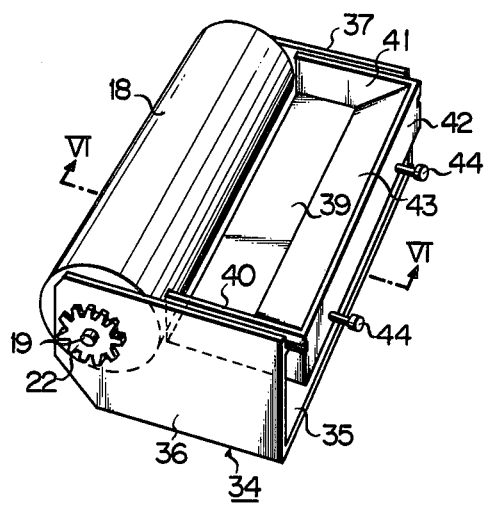
FIG. 7 is a perspective view of the coating apparatus of the invention shown in FIG. 6.

FIGS. 6 and 7 show a mixture transferring device which feeds the mixture 3 to the roller 18 from the side thereof. This transferring device has a base frame 34 formed of a transversely elongated base plate 35 and end plates 36 and 37 provided at both ends of the base plate 35. The roller 18 is supported at the front side of the base frame 34. Supported by the base frame 34, the container 12 to contain the mixture 3 is disposed by the side of the roller 18. This container 12 is composed of a bottom plate 39 with an inverted-rectangular trapezoidal cross-section whose edge 39a forms a blade to regulate the thickness of the mixture layer 3a over the roller 18, end plates 40 and 41 disposed at both ends of the bottom plate 39, and an inclined plate 43 supported by the bottom plate 39 and a side plate 42. The bottom plate 39 is attached to the side plate 42 by means of an adjusting means 44, such as a screw, so as to allow the adjustment of the gap between the bottom plate 39 and roller 18. According to this device, the mixture 3 may always be supplied to the roller by means of the inclined plate 43 and consumed without any waste, and besides the mixture layer 3a may easily be formed over the roller 18 even with a low viscosity mixture.

Figure 8:
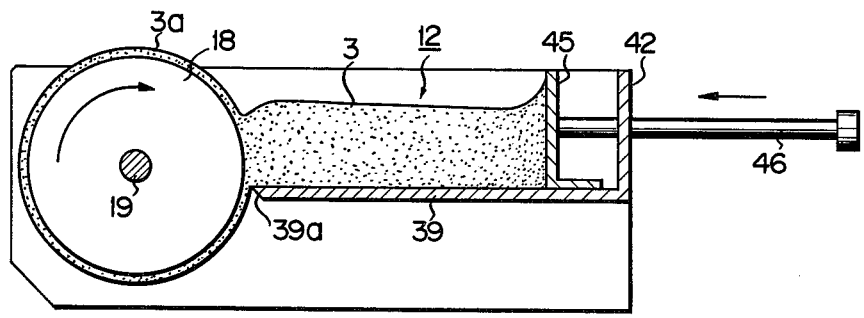
FIG. 8 is a sectional view of the coating apparatus of the invention showing still another embodiment.

The device shown in FIG. 8 is the same transferring device as that shown in FIGS. 6 and 7, except only that the longitudinal direction of the bottom plate 39 is elongated, and there is used, instead of the inclined plate 43, a pushing plate 45 movably supported by a pushing rod 46 penetrating through the side plate 42. According to this device, a larger quantity of mixture 3 may be committed to the container 12 and a high viscosity, high thixotropy mixture may unwastefully be consumed by pushing the mixture 3 by means of the pushing plate 45. This pushing plate 45 may be periodically manually operated or automatically operated according to the consumption of the mixture.

Figure 9:
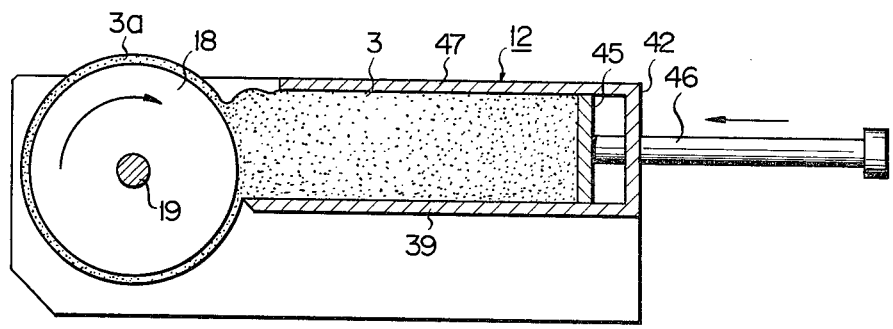
FIG. 9 is a sectional view of the coating apparatus of the invention showing an alternative embodiment.

FIG. 9 shows the same device as that shown in FIG. 8, except only that a top cover plate 47 is attached to the top of the container 12. By providing this top cover plate 47, the mixture may be prevented from jumping over the pushing plate 45 to overflow to the exterior when it is pushed by the pushing plate 45 as well as from drying.

Figure 10:
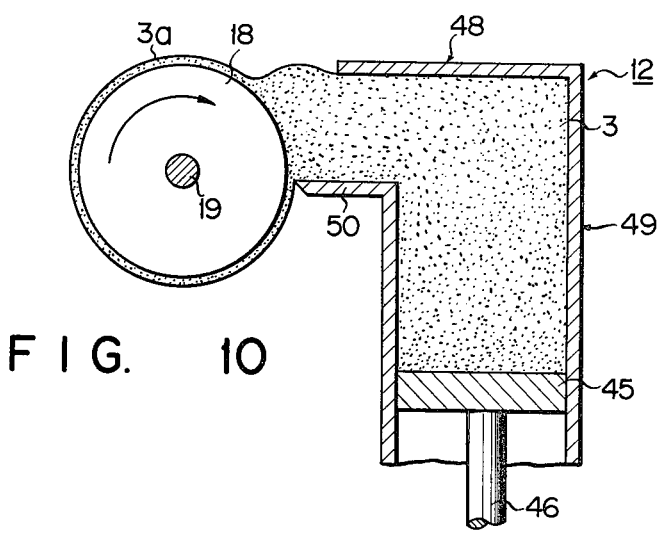
FIG. 10 is a sectional view of the coating apparatus of the invention showing another alternative embodiment.

FIG. 10 shows a mixture transferring device in which the container 12 is composed of a horizontal square tubular portion 48 disposed by the side of the roller 18 and a vertical square tubular portion 49 integrally formed on the rear end of the square tubular portion 48. A bottom plate 50 of the horizontal square tubular portion 48 regulates the thickness of the mixture layer 3a over the roller 18.

Figure 11:
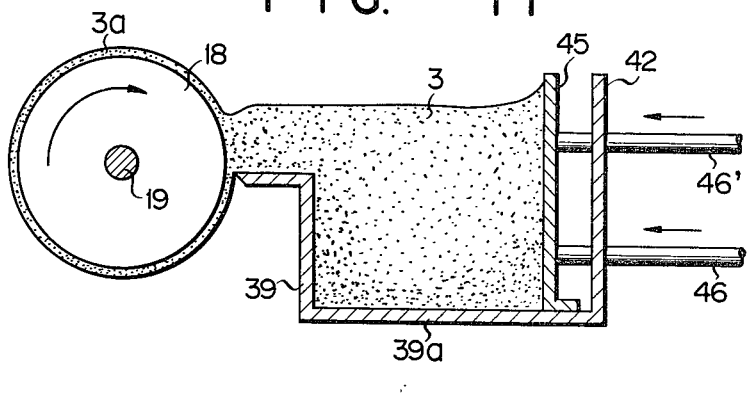
FIG. 11 is a sectional view of the coating apparatus of the invention showing still another alternative embodiment.

FIG. 11 shows the same transferring device as that shown in FIG. 8, except only that the bottom plate has a recess 39a and there is provided another pushing rod 46' for pushing the pushing plate 45.

The transferring devices as shown in FIGS. 10 and 11 allow increased quantity of mixture supplied without requiring any substantial transverse space.

Figure 12:
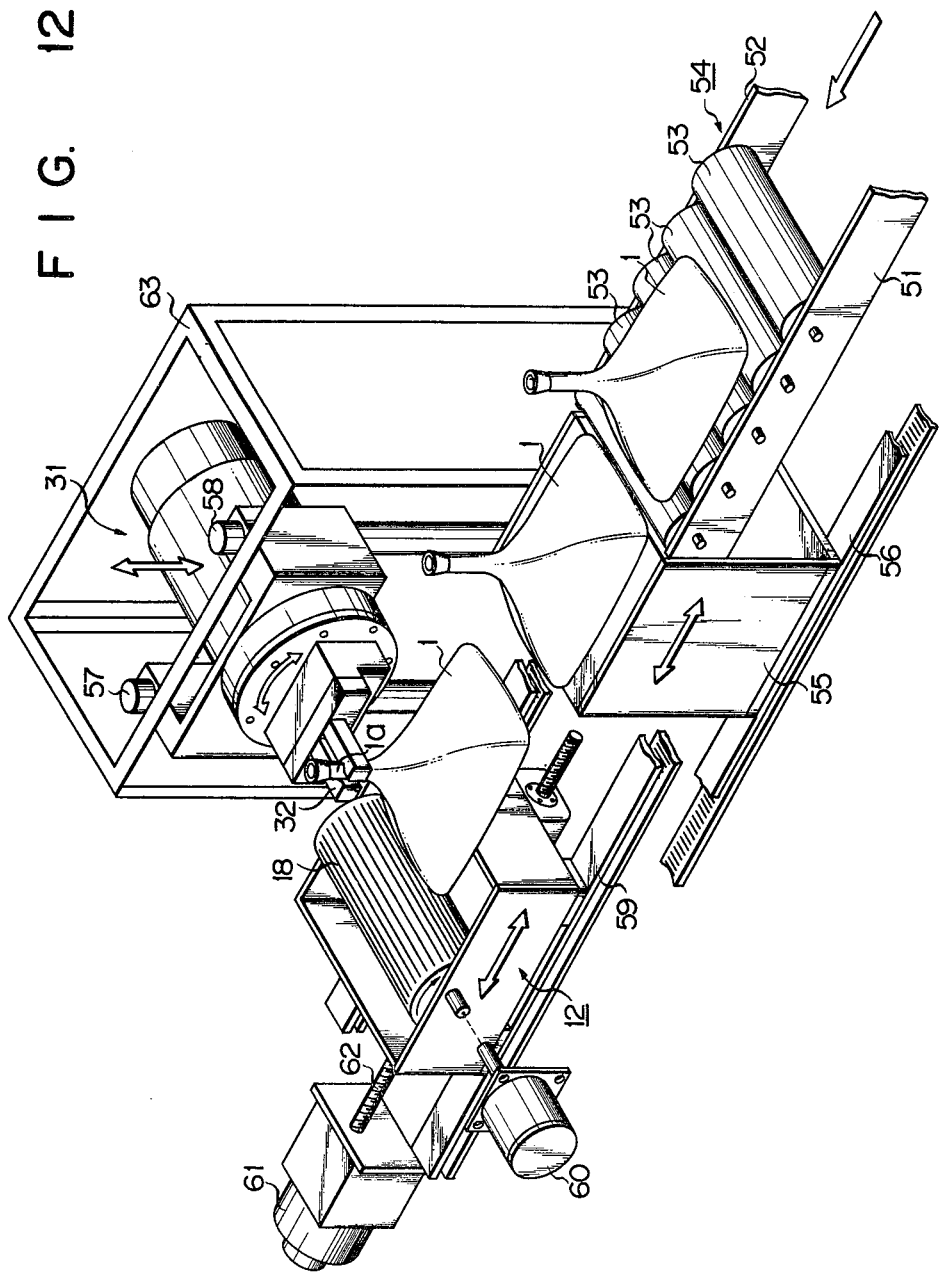
FIG. 12 is a perspective view of the coating apparatus of the invention showing a further embodiment.

FIG. 12 shows the coating apparatus according to another embodiment of this invention. The funnel 1, with its end face downward, is conveyed on to a carrier 55 by means of a roller conveyer 54 composed of a plurality of rollers 53 supported by side plates 51 and 52. This carrier 55 moves along a rail 56 to carry the funnel 1 to a position under the reversing mechanism 31 supported by a frame 63. Then the reversing mechanism 31 comes down along columns 57 and 58, and the clamp 32 holds the neck portion 1a of the funnel 1. Thereupon, the transferring mechanism formed of the container 12 containing the mixture and the roller 18 rotated by a motor 60 is shifted to a position under the funnel 1 held by the clamp 32 by means of a ball screw 62 and transfer the mixture to the downward end face of the funnel. After the transference, the transferring mechanism goes back, and the reversing mechanism 31 goes up and reverses the funnel 1 to turn up its sealed end face.

What is claimed is:

1. An apparatus for coating an end face of a funnel portion of a cathode ray tube with a glass frit mixture, comprising: a reversing mechanism including a clamp means and a rotating means for rotating said clamp means and supported to move in a vertical direction; a first conveyer means for conveying said funnel with said end face downward to a position under said reversing mechanism; a container means for containing said glass frit mixture; a roller means disposed in said container means for picking up said mixture to form a layer of said mixture on the peripheral surface of said roller means; and a second conveyer means for conveying said container means to a position under said reversing mechanism; said reversing mechanism coming down to hold said funnel by means of said clamp means when said funnel has been conveyed to said reversing mechanism by said first conveyer means, said container means being then conveyed to a position under said held funnel by said second conveyer means to transfer said mixture layer over said roller means to said end face of said funnel, and said reversing mechanism thereafter going up and reversing by means of said rotating means said funnel held by said clamp means to turn up said end face.

* * * * *